UNITED STATES PATENT OFFICE

2,353,700
PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 15, 1942, Serial No. 447,157

9 Claims. (Cl. 252—333)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have discovered that if one oxalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which are efficient demulsifiers for crude oil emulsions.

The compounds herein described that are used as the demulsifier of our process, may be produced in any suitable manner, but are usually manufactured by following one of two general procedures. In one of said procedures the oxyalkylated glycerol, which is, in essence, a polyhydric alcohol, is reacted with a polybasic acid so as to give an acidic material or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

If treated with an oxyalkylating agent, and momentarily consideration will be limited to an oxyethylating agent, one may obtain an oxyethylated glycerol of the following formula type:

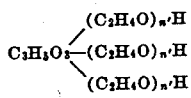

in which the value of $n'$ may vary from 3 to 10 and all the values of $n'$ need not be identical. If a polybasic carboxy acid be indicated by the formula:

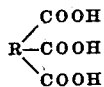

then the acyclic reaction product of one mole of oxyethylated glycerol and one mole of a polybasic carboxy acid may be indicated by the following formula:

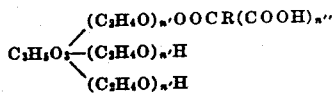

in which $n''$ has the value of one or two. Similarly, if two moles of the polybasic acid be used, then the compound may be indicated by the following formula:

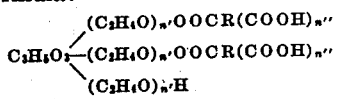

Likewise, if three moles of a polybasic acid are employed, the compound may be indicated by the following formula:

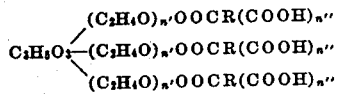

If a fractional ester of the kind exemplified by the three preceding formulas is reacted with one or more moles of an alcohol of the kind previously described in a generic sense as $R_1(OH)_m$, then obviously, one may obtain a material of the type indicated by the following formula:

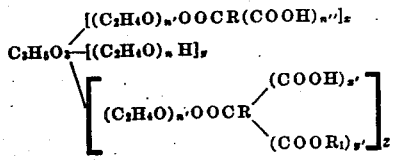

in which $x$ is 0, 1 or 2, $y$ is 0, 1 or 2, and $z$ is 1, 2 or 3, and $x'$ is 0 or 1, and $y'$ is 1 to 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

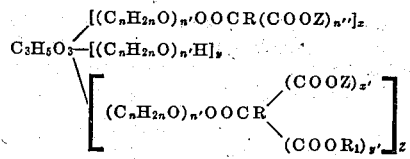

in which $n$ replaces the numbers 2, 3 or 4, Z includes the acidic hydrogen atom itself. In the above formula and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one of several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulas indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would in reality obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely polymers of the monomeric compounds, but since, for all practical purposes, they can be so indicated, and since such practice is common in the arts concerned with materials of this type, it is so adopted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least one free hydroxyl, or both. The word "polar" has sometimes been used in the arts in this particular sense to indicate the presence of at least one free hydroxyl group, or at least one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol monoether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in a co-pending application hereinafter referred to. The reactants thus contemplated include the type in which there is an amino or amido nitrogen atom. Particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl) acetamide, the acetamide of tris(hydroxymethyl) aminomethane, tetrahydroxylated ethylene diamine, etc. Compounds may also be derived from cyclic diglycerol and the like.

Furthermore, for convenience, attention is directed to a somewhat similar class of materials which are described in U. S. Patent No. 2,295,167, dated September 8, 1942, to De Groote and Keiser. Said patent involves the use of the same type of alcoholic bodies for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than eight carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a sub-resinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German Patent No. 605,973, dated November 22, 1934, to I. G. Farbenindustrie, Akt. Ges.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol.

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to one.

OXYETHYLATED GLYCEROL MALEATE

Example 1

One pound mole of oxyethylated glycerol (1 to 15 ratio) prepared in the manner previously described is treated with one pound mole of maleic anhydride and heated at approximately 110° C. for approximately thirty minutes to two hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

OXYETHYLATED GLYCEROL MALEATE

Example 3

The same procedure is followed as in the two preceding examples, except that three moles of maleic anhydride are employed so as to obtain the trimaleate.

OXYETHYLATED GLYCEROL MALEATE

Example 4

The same procedure is employed as in the preceding examples, except that oxyethylated glycerol (ratio 1 to 18) is substituted in place of oxyethylated glycerol (ratio 1 to 15).

OXYETHYLATED GLYCEROL MALEATE

Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds are materials conveniently designated as hydroxylated esters of high molal sulfonic acids of the kind subsequently described. If a high molal sulfonic acid be indicated by the conventional formula:

$$R.SO_3H$$

then a hydroxylated ester which may actually have more than one hydroxyl group in the radical which replaces the sulfonic acid hydrogen atom, may be indicated by the following formula:

$$R.SO_3TOH$$

A material of the kind above described illustrates the compounds herein contemplated as reactants with certain added provisos:

(a) That the sulfonic acid in the form of a salt or acid be surface-active, as subsequently defined; and (b) That the ester derived therefrom prior to treatment with a fractional ester derived from oxyethylated glycerol and a polybasic acid be water-insoluble.

As has been indicated, the compounds herein described are derivatives of surface-active sulfonic acids which, generally speaking, are water-soluble, but in some instances, such as in the case of petroleum mahogany acids, may be essentially oil-soluble, although such oil-soluble acids may also show water solubility to a greater or lesser degree, particularly in the form of sodium, potassium, or ammonium salts. Such sulfonic acids have a molecular weight range between 200 and 1,000, and are characterized by the fact that their alkali salts are surface-active. By "surface-active" we mean that a relatively dilute solution of alkali metal salts, for instance, the sodium or potassium salt, and also ammonium salt, in a solution containing a few tenths of a percent or thereabouts, will show a marked lowering of the static surface tension, in comparison with distilled water. Where the sulfonic acids or their salts are oil-soluble, surface activity may be indicated by the ability or characteristic property of producing water-in-oil emulsions, and sometimes by the ability to cause oily vehicles to form or broth. Usually, the acids themselves show the same surface-active property as the salts.

Certain of the raw materials used in the manufacture of the new chemical compound herein described, that is employed as the demulsifier of our process, for example, certain surface-active sulfonic acids are well known compositions of matter. In order to show the wide range of suitable sulfonic acids, brief reference will be made to a variety of such materials.

More specifically, in the manufacture of compounds of the kind herein contemplated, one may employ as raw materials petroleum sulfonic acids, fatty sulfonic acids, fatty aromatic sulfonic acids, alkylated monocarbocyclic sulfonic acids, alkylated non-hydrogenated dicarbocyclic sulfonic acids, partially or completely hydrogenated alkylated dicarbocyclic sulfonic acids, alkylated polycarbocyclic sulfonic acids containing at least three nuclei, cycloalkylated carbocyclic sulfonic acids free of alkyl radicals, and aralkylated carbocyclic sulfonic acids free of alkyl radicals. In some instances the actual manufacture involves the formation of a salt of a sulfonic acid, rather than a sulfonic acid, as, for example, where sodium bisulfite or sodium sulfite is used as a sulfonating agent. In such instances the sulfonic acid can generally be obtained by some conventional procedure, as, for example, dissolving the sodium sulfonate in any suitable low molal alcohol, passing in hydrochloric acid gas with the precipitation of sodium chloride, and the liberation of a sulfonic acid which is usually soluble in the alcoholic medium. The alcoholic solution of the sulfonic acid can be separated from the inorganic salt by filtration, and then the sulfonic acid can be recovered by distillation of the alcoholic solvent.

The sulfonic acids derived from petroleum, constitute an important group of acids which may be used as raw materials for the manufacture of compounds or demulsifiers of the type contemplated by our present invention. Petroleum sulfonic acids, regardless of whether derived as the principal product of reaction, or as the by-product, can be divided into two general types, to wit, green acid or acids, and mahogany acid or acids. The green acids are characterized by being water-soluble or dispersible. For further information as to the water-soluble type of petroleum sulfonic acids, see list of patents appearing in our aforementioned pending application for patent.

Reference is also made to our aforementioned co-pending application, which gives a series of patents illustrating the following types: sulfonaphthenic acids, oil-soluble petroueum sulfonic acids, fatty sulfonic acids, sulfo-aromatic fatty acids, alkylated aromatic sulfonic acids, including both the monocyclic and polycyclic type; sulfonic acids derived from tallol, rosin, rosin derivatives, and the like; sulfonic acids containing amino and amido linkages; aromatic alkylenes ether sulfonic acids, sulfo-dicarboxylic acids; and sulfonic acids derived from high molal alcohols. Specific reference is made to each and all of such patents appearing in our said co-pending application, and also to the literature references concerned with the same subject-matter.

The method of manufacturing hydroxylated esters of sulfonic acids is well known, although direct reaction between the sulfonic acid and a polyhydric alcohol, such as ethylene glycol, is not applicable, for the reason that one obtains little or no yield of the hydroxylated ester. One procedure contemplates the conversion of sulfonic acid into the sulfonchloride, and subsequently reacting the sulfonchloride with a polyhydric alcohol, with the liberation of hydrochloric acid. Another procedure involves reaction between the sulfonic acid, or preferably, a salt, such as the sodium salt, and the chlorhydrin, such as ethylene glycol chlorhydrin. Another procedure for the manufacture of such hydroxylated sulfonic acid esters is illustrated in some of the patents which appear in our aforementioned co-pending application, as, for example, in De Groote et al. U. S. Patent No. 2,106,242, dated January 25, 1938. (See last three formulas on page 3 of said De Groote et al. patent.)

In connection with materials of the kind typified by these properties, it is desirable to employ a substituted methyl chloride. For instance, one can obtain diamylated naphthalene, triamylated naphthalene, mono-octylated naphthalene, or the like. Such materials can be converted into the substituted naphthyl methylchloride by the procedure indicated in U. S. Patent No. 2,166,554, dated July 18, 1939, to Roblin.

The preferred way of preparting such materials is to use the procedure described in U. S. Patent No. 2,208,581, dated July 23, 1940, to Hoeffelmann. Briefly stated, the procedure employed is to obtain the free sulfonic acid in an anhydrous state and treat with a compound containing an olefin oxide radical. As typical examples of applicable compounds, may be mentioned glycerine epichlorhydrin, glycid alcohol, ethylene oxide, propylene oxide, butene-2-oxide, butene-1-oxide, isobutylene oxide, butadiene oxide, chloroprene oxide, isoprene oxide, decene oxide, styrene oxide, cyclohexylene oxide, cyclopentene oxide, etc.

Note, however, that there are certain differences between the procedure employed for the manufacture of the intermediate raw material in the present instance, as compared with the procedure, as employed in said aforementioned Hoeffelmann patent. The Hoeffelmann patent contemplates treatment of sulfonic acids, which are not necessarily surface-active, for instance, benzene sulfonic acid, with an olefine oxide, so as to produce materials which are, for the main part, water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent phthalation step. There is no objection to the presence of a recurring ether linkage, provided that the ester is still water-insoluble. This may be illustrated in the following manner, using ethylene oxide as the reactant.

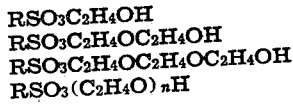

One is interested primarily in obtaining a material of the following type:

But materials illustrated by any of the three subsequent types;

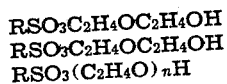

are just as satisfactory, provided that the ester, prior to treatment with an oxyethylated glycerol fractional ester of the kind described, is water-insoluble. In some instances, the presence of the recurring ether linkage may give some added desirable characteristic. Ordinarily speaking, one is concerned only with minimum reactant cost; and thus, the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid, may be considered as an upper limit, but obviously, solubility is influenced by the alkylene oxide employed. Butylene oxide naturally will not cause a sulfonic acid to be converted into a water-soluble ester as readily as ethylene oxide.

HYDROXYLATED SULFONIC ACID ESTERS

*Example 1*

A mahogany sulfonate obtained from the manufacture of white oil from Pennsylvania grade of crude petroleum is treated in the manner described in the Kessler and Salzmann U. S. Patent No. 2,125,300. The material, so obtained, may contain moisture in varying amounts from a few tenths of a percent, to an appreciable amount. If the amount of moisture present represents more than two or three percent, or even in such instances where this relatively small percentage is present, it is preferably converted to the anhydrous state by admixture with xylene or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained, in the presence or absence of a selected inert solvent, is reacted with one to three moles of ethylene oxide in the manner described in the Hoeffelmann Patent No. 2,208,581, so as to yield a water-insoluble ester. The anhydrous sodium salt is converted into the anhydrous acid by HCl in anhydrous alcohol.

HYDROXYLATED SULFONIC ACID ESTERS

*Example 2*

Green acids are obtained from a Gulf Coast lubricating oil distillate having an S. U. viscosity at 100° F. of about 400 seconds. The procedure employed is that described in the Robertson Patent No. 2,188,770. The material, so obtained, contains considerable moisture and must be dehydrated by any conventional procedure, such as a vacuum drier, or by means of xylene, or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained in the presence or absence of a selected inert solvent, is reacted with one to three moles of ethylene oxide in the manner described in the Hoeffelmann Patent No. 2,208,581, so as to yield a water-insoluble ester. The anhydrous acid obtained in the same manner as in Example

HYDROXYLATED SULFONIC ACID ESTERS

Example 3

Dipropyl naphthalene monosulfonic acid is obtained in the anhydrous state by passing dry carbon dioxide gas through the same at a temperature sufficient to insure its fluidity. The dried material is admixed with about 50% by weight of xylene and is treated with one to three moles of ethylene oxide in the manner described in the Hoeffelmann Patent No. 2,208,581, so as to yield a water-insoluble ester. The xylene can then be removed by distillation. Esterification can be conducted in the absence of xylene, if desired.

HYDROXYLATED SULFONIC ACID ESTERS

Example 4

The sulfonic acid derivative of stearic acid is produced according to Example 1, of Gunther and Hetzer U. S. Patent No. 1,926,442. The sulfostearic acid, so obtained, is converted into the anhydrous state by any suitable procedure. It may be heated to approximately 110° to 120° C., and dried carbon dioxide gas passed through until the material is anhydrous. It may be dried in a vacuum drier, so as to yield an anhydrous material. It may be distilled in the presence of an insoluble solvent, such as xylene, so that the xylene is permitted to carry off water during the distillation. Vapors, so obtained, are condensed, and the water separated from the xylene. The xylene can be returned for re-circulation so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl stearate sulfonic acid, so obtained, is treated with one to three moles of ethylene oxide in the manner described in the Hoeffelmann Patent No. 2,208,581, so as to yield a water-insoluble ester.

HYDROXYLATED SULFONIC ACID ESTERS

Example 5

The sulfo-aromatic fatty acid is produced from oleic acid and benzol in the manner described in the U. S. Patent No. 1,416,284. The sulfonated mass obtained in the customary manner is diluted and boiled or steamed in the presence of excess sulfuric acid until any fatty acid sulfates comparable to oleic acid hydrogen sulfate has been decomposed. After such decomposition of such organic acid sulfates, separation is permitted and the waste acid withdrawn. The mass, so obtained, is neutralized to the methyl orange indicator endpoint, so as to neutralize all sulfonic acid radicals present by means of caustic soda. The material then is dissolved in several times its volume of water and extracted with a suitable solvent, such as petroleum ether, benzol, or the like, so as to remove unsulfated fatty material. The dilute solution of the sulfoaromatic material, so obtained, is converted into the anhydrous state by any suitable procedure. It may be heated to approximately 110° to 120° C., and dried carbon dioxide gas passed through until the material is anhydrous. It may be dried in a vacuum drier, so as to yield an anhydrous material. It may be distilled in the presence of an insoluble solvent, such as xylene, so that the xylene is permitted to carry off water during distillation. Vapors, so obtained, are condensed and the water separated from the xylene. The xylene can be returned for re-circulation to carry off more water. In any event, the anhydrous material having been obtained in any suitable manner, is dissolved in any suitable low molal alcohol, such as ethyl alcohol. The alcoholic solution, substantially water-free, is treated with hydrochloric acid gas, so as to precipitate sodium chloride and liberate an alcoholic solution of the sulfo-aromatic fatty acid. The salt formed is separated and the alcoholic solution refluxed until the sulfoaromatic material is converted into the corresponding ethyl ester by replacement of the carboxylic hydrogen atom by an ethyl group. One pound mole of the anhydrous sulfophenyl stearic acid ethyl ester is treated with one to three moles of ethylene oxide in the manner described in the Hoeffelmann Patent No. 2,208,581, so as to yield a water-insoluble ester.

HYDROXYLATED SULFONIC ACID ESTERS

Example 6

Tallol is converted into the hydroxy ethyl ester in the manner described in Example 4 of British Patent No. 340,272. The hydroxyethyl ester is then esterified in equal molal proportions with chloroacetic acid. The product, so obtained, is treated in the conventional manner with one mole of sodium sulfite with the elimination of sodium chloride. The sodium sulfonate, so obtained, is dissolved in alcohol and the free sulfonic acid liberated in the manner previously suggested. The sulfonic acid, so obtained, is anhydrous or can be converted into the anhydrous state by any suitable procedure. It may be heated to approximately 110° to 120° C. and dried carbon dioxide gas passed through until the material is anhydrous. It may be dried in a vacuum drier, so as to yield an anhydrous material. It may be distilled in the presence of an insoluble solid, such as xylene, so that the xylene is permitted to carry off water during the distillation. Vapors, so obtained, are condensed and the water separated from the xylene. The xylene can be returned for re-circulation, so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl ester sulfonic acid, so obtained, is treated with one to three moles of ethylene oxide in the manner described in the Hoeffelmann Patent No. 2,208,581, so as to yield a water-insoluble ester.

HYDROXYLATED SULFONIC ACID ESTERS

Example 7

Dipentene is converted into the water-soluble sulfonic acid following the specific directions of the Cromwell and Merley Patent No. 2,220,678. Such sulfonic acid is rendered anhydrous, and one pound mole of the anhydrous acid is treated with one to three pound moles of ethylene oxide, in the manner described in the Hoeffelmann Patent No. 2,208,581, so as to yield a water-insoluble ester.

HYDROXYLATED SULFONIC ACID ESTERS

Example 8

A crude distilled pine oil is sulfonated in the manner described in Example 5 of the Cromwell and Merley Patent. Such sulfonic acid is rendered anhydrous, and one pound mole of the anhydrous acid is treated with one to three pound moles of ethylene oxide, in the manner described in the Hoeffelmann Patent No. 2,208,581, so as to yield a water-insoluble ester.

HYDROXYLATED SULFONIC ACID ESTERS

Example 9

Commercial abietic acid or crude resin is sulfonated in the manner described in Example 6 of the Cromwell and Merley patent. The sulfonic acid produced by said procedure is rendered anhydrous, and one pound mole of the anhydrous acid is treated with one to three pound moles of ethylene oxide, in the manner described in the Hoeffelmann Patent No. 2,208,581, so as to yield a water-insoluble ester.

HYDROXYLATED SULFONIC ACID ESTERS

Example 10

The same procedure is followed as in the preceding Examples 1 to 9, inclusive, except that four to six moles of ethylene oxide are employed instead of one to three moles.

HYDROXYLATED SULFONIC ACID ESTERS

Example 11

The same procedure is followed as in Examples 1–10, inclusive, except that glycid is substituted for ethylene oxide.

HYDROXYLATED SULFONIC ACID ESTERS

Example 12

Diamyl naphthalene is treated with formaldehyde in the presence of hydrochloric acid to give a compound of the following composition:

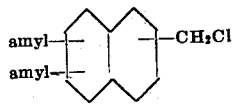

(See U. S. Patent No. 2,166,554, to Roblin et al., dated July 18, 1939.)

This is a well known procedure and requires no description. The product, so obtained, is treated with sodium sulfite, with elimination of sodium chloride. The salt, so obtained, is treated with oleum to yield a disulfonic acid of the following composition:

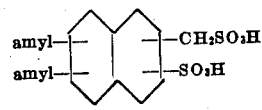

The product, so obtained, is treated with ethylene oxide in the manner previously described, so as to give the polyhydroxylated ester.

HYDROXYLATED SULFONIC ACID ESTERS

Example 13

Mono-octyl naphthalene is substituted for diamylated naphthalene in the previous example.

HYDROXYLATED SULFONIC ACID ESTERS

Example 14

The sulfonic acids of the kind described in Examples 12 and 13, preceding, or other suitable disulfonic acids, are treated with glycid instead of ethylene oxide.

COMPLETED MONOMERIC DERIVATIVE

Example 1

One pound mole of a product of the kind described under the heading "Oxyethylated Glycerol Maleate, Example 1", is reacted with one pound mole of a hydroxylated sulfonic acid ester of the kind illustrated by one or more of the previous examples, so as to eliminate a mole of water.

COMPLETED MONOMERIC DERIVATIVE

Example 2

The same procedure is followed as in Completed Monomeric Derivative, Example 1, preceding, except that the dimaleate described under the heading "Oxyethylated Glycerol Maleate, Example 2" is used instead of the monomaleate.

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the dimaleate, or each pound mole of the trimaleate, instead of using one pound mole of a hydroxylated sulfonic acid ester of the kind described as a reactant, one employs two pound moles.

COMPLETED MONOMERIC DERIVATIVE

Example 5

The same procedure is followed as in Example 3, preceding, except that for each pound mole of trimaleate, instead of adding one pound mole of a hydroxylated sulfonic acid of the kind described, one adds three pound moles of a hydroxylated sulfonic acid of the kind described.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated Glycerol Maleate, Example 4, preceding.)

COMPLETED MONOMERIC DERIVATIVE

Example 7

The same procedure is followed as in Example 6, immediately preceding, except that the oxyethylated glycerol employed represents one having an even higher degree of oxyethylation. For example, one indicated by the ratio of 1 to 21 (See Oxyethylated Glycerol Maleate, Example 5 preceding.)

COMPLETED MONOMERIC DERIVATIVE

Example 8

Compounds are obtained in the manner described previously, except that the hydroxylated esters are obtained by the action of propylene oxide instead of ethylene oxide.

COMPLETED MONOMERIC DERIVATIVE
Example 9

Compounds are obtained in the manner described previously, except that the hydroxylated esters are obtained by the action of butylene oxide instead of ethylene oxide.

COMPLETED MONOMERIC DERIVATIVE
Example 10

Compounds are obtained in the manner descdibed previously, except that the hydroxylated esters are obtained by the action of glycid instead of ethylene oxide.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. (See U. S. Patent No. 2,075,107, dated March 30, 1937, to Frasier.)

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especialy in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer. For instance, a polymer whose molecular weight is two, three, four, five, or six times the molecular weight of the monomer. Polymerization is hastened by the presence of an alkali, and thus in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, non-hydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxy acetic acid, lactic acid, ricinoleic acid and also polybasic acids of the kind herein contemplated.

With the above facts in mind, it becomes obvious that what has been previously said as to polymerization, with the suggestion that by-products or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein described vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. When employed as a demulsifier, in the resolution of oil field emulsions, they may be added to the emulsion at the ratio of 1 part in 10,000, 1 part in 20,000, 1 part in 30,000, or for that matter, 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious over-simplification of the rationale underlying demulsification, and does not even consider the resistance of an interfacial film to crumbling, displacement, being forced into solution, altered wetability and the like. As to amidification polymers, for instance, where Z is a polyaminoamide radical, see what is said subsequently.

COMPLETED POLYMERIC DERIVATIVES INCLUDING HEAT-REARRANGED COGENERS

Example 1

A monomeric material obtained by reaction between one pound mole of oxyethylated glycerol dimaleate and one pound mole of hydroxyethyl ester of dibutyl naphthalene sulfonic acid is heated for a period of two to 60 hours at a temperature of approximately 220–240° C., so as to eliminate sufficient water in order to insure that the resultant product has a molecular weight of approximately twice that of the initial raw material.

COMPLETED POLYMERIC DERIVATIVES INCLUDING HEAT-REARRANGED COGENERS

Example 2

The same procedure is followed as in the preceding example, except that polymerization is continued, using either a somewhat longer reaction time, or it may be a somewhat higher temperature, or both, so as to obtain a material having a molecular weight of approximately three to four times that of the initial product.

COMPLETED POLYMERIC DERIVATIVES INCLUDING HEAT-REARRANGED COGENERS

Example 3

The same procedure is followed as in Examples 1 and 2, preceding, except that one employs as reactants the hydroxyethyl ester of petroleum sulfonic acids of the green acid type or the mahogany acid type, instead of the hydroxyethyl ester of dibutyl naphthalene sulfonic acid.

COMPLETED POLYMERIC DERIVATIVES INCLUDING HEAT-REARRANGED COGENERS

Example 4

The same procedure is followed as in Examples 1 to 3, preceding, except that one polymerizes a mixture instead of a single monomer, for instance, a mixture of materials of the kind derived in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the monomer and then subsequently convert the monomer into the polymer. The reactants may be converted through the monomer to the polymer, in one step. Indeed, the formation of the monomer and polymerization may take place simultaneously. This is especially true if polymerization is conducted in the absence of an inert solvent, as previously described, and if one uses a comparatively higher temperature, for instance, approximately 220° C. for polymerization. Thus, one pound mole of oxyethylated glycerol maleate of the kind described is mixed with one pound mole of the hydroxyethyl ester of dibutylene naphthalene sulfonic acid and reacted for thirty hours at approximately 220° C. until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two distinct phases, one being possibly an oily body of moderate viscosity, and the other being a heavier material, which is sticky or sub-resinous in nature. In many instances, it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Conventional demulsifying agents employed in the treatment of oil field emulsions are used as such, or after dilution with any suitable solvent, such as water; petroleum hydrocarbons such as gasoline, kerosene, stove oil, a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent used in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Cognizance must be taken of the fact that the surface of the reacting vessel may increase or decrease reaction rate and degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 447,151; 447,152; 447,153; 447,154; 447,155; 447,156; 447,158; 447,159; 447,160; 447,161; 447,162; 447,163; 447,164; 447,165; 447,166; 447,167 and 447,168, all filed June 15, 1942.

Having thus described our invention, what we claim as new and desire to secure by Letters Patent is:

1. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

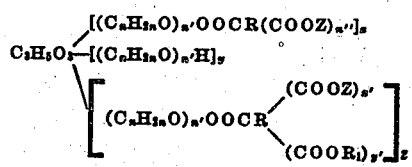

in which R is the carboxyl-free radical of a polybasic carboxy acid having not over 8 carbon atoms; R₁ is a polyhydric alcohol radical in which one hydroxy hydrogen atom has been replaced by the acyl radical of a surface-active sulfonic acid having a molecular weight between 200 and 1,000; the polyhydric alcohol radical and the sulfonic acyl radical being part of a water-insoluble fractional ester; Z is an acidic hydrogen atom equivalent including the acidic hydrogen atom itself; $n$ represents the numerals 2 to 4; $n'$ represents the numerals 3 to 10; $n''$ represents the numerals 1 to 2; $x$ represents the numerals 0 to 2; $y$ represents the numerals 0 to 2; $z$ represents the numerals 1 to 3; $x'$ represents the numerals 0 to 1; and $y'$ represents the numerals 1 to 2.

2. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

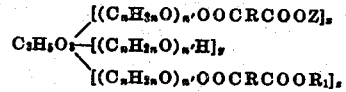

in which R is a carboxyl-free radical of a dibasic carboxy acid having not over 6 carbon atoms; R₁ is a polyhydric alcohol radical in which one hydroxy hydrogen atom has been replaced by the acyl radical of a surface-active sulfonic acid having a molecular weight between 200 and 1,000; the polyhydric alcohol radical and the sulfonic acyl radical being part of a water-insoluble fractional ester; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

3. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

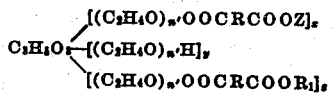

in which R is a carboxyl-free radical of a dibasic carboxy acid having not over 6 carbon atoms; R₁ is a polyhydric alcohol radical in which one hydroxy hydrogen atom has been replaced by the acyl radical of a surface-active sulfonic acid having a molecular weight between 200 and 1,000; the polyhydric alcohol radical and the sulfonic acyl radical being part of a water-insoluble fractional ester; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

4. A process for breaking petroleum emulsions of the water-in-oil type, characterized by subjecting the emulsion to the action of a demulsifier comprising a polar member of the class consisting of monomers, sub-resinous esterification polymers, and cogeneric sub-resinous heat-rearranged derivatives of the monomers and aforementioned polymers, separately and jointly, and of the following formula:

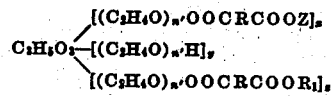

in which R is a carboxyl-free radical of a dibasic carboxy acid having not over 6 carbon atoms; R₁ is a polyhydric alcohol radical in which one hydrogy hydrogen atom has been replaced by the acyl radical of a surface-active sulfonic acid having a molecular weight between 200 and 1,000; the polyhydric alcohol radical and the sulfonic acyl radical being part of a water-insoluble fractional ester; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

5. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

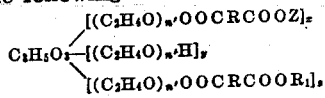

in which R is a carboxyl-free radical of a dibasic carboxy acid having not over 6 carbon atoms; $R_1$ is a polyhydric alcohol radical in which one hydroxy hydrogen atom has been replaced by the acyl radical of a surface-active sulfonic acid having a molecular weight between 200 and 1,000; the polyhydric alcohol radical and the sulfonic acyl radical being part of a water-insoluble fractional ester; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

6. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

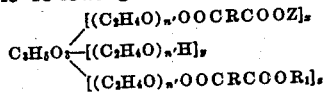

in which R is a carboxyl-free radical of a dibasic carboxy acid having not over 6 carbon atoms; $R_1$ is a polyhydric alcohol radical in which one hydroxy hydrogen atom has been replaced by the acyl radical of a surface-active sulfonic acid having a molecular weight between 200 and 500; the polyhydric alcohol radical and the sulfonic acyl radical being part of a water-insoluble fractional ester; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

7. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and the following formula:

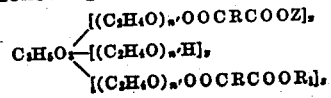

in which R is a carboxyl-free radical of a dibasic carboxy acid having not over 6 carbon atoms; $R_1$ is a polyhydric alcohol radical in which one hydroxy hydrogen atom has been replaced by the acyl radical of a surface-active sulfonic acid having a molecular weight between 200 and 500; the polyhydric alcohol radical and the sulfonic acyl radical being part of a water-insoluble fractional ester and said sulfonic acid acyl radical being an alkylaryl sulfonic acid radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

8. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

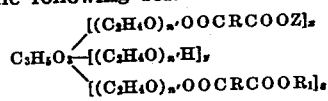

in which R is a carboxyl-free radical of a dibasic carboxy acid having not over 6 carbon atoms; $R_1$ is a polyhydric alcohol radical in which one hydroxy hydrogen atom has been replaced by the acyl radical of a surface-active sulfonic acid having a molecular weight between 200 and 500; the polyhydric alcohol radical and the sulfonic acyl radical being part of a water-insoluble fractional ester and said sulfonic acid acyl radical being a petroleum green acid radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

9. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

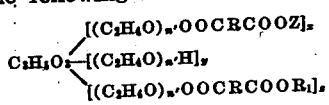

in which R is a carboxyl-free radical of a dibasic carboxy acid having not over 6 carbon atoms; $R_1$ is a polyhydric alcohol radical in which one hydroxy hydrogen atom has been replaced by the acyl radical of a surface-active sulfonic acid having a molecular weight between 200 and 500; the polyhydric alcohol radical and the sulfonic acyl radical being part of a water-insoluble fractional ester and said sulfonic acid acyl radical being a petroleum mahogany acid radical; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

MELVIN DE GROOTE.
BERNHARD KEISER.

Certificate of Correction

Patent No. 2,353,700. July 18, 1944.

MELVIN DE GROOTE ET AL.

It is hereby certified that errors appear in the printed specification of the above numbered patent requiring correction as follows: Page 1, second column, line 51, in the formula, for the sub letter "n" read $n^1$; and second column, line 58, for "1 to 2" read *1 or 2*; page 4, first column, line 49, for "form" read *foam*; line 50, for "broth" read *froth*; and second column, line 31, for "petroueum" read *petroleum*; page 6, first column, line 55, Example 5, before "sulfate" insert *hydrogen*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*